US006873237B2

United States Patent
Chandrasekaran et al.

(10) Patent No.: US 6,873,237 B2
(45) Date of Patent: Mar. 29, 2005

(54) CORE STRUCTURE (75) Inventors: Sriram Chandrasekaran, Burbank, CA (US); Vivek Mehrotra, Newbury Park, CA (US); Jian Sun, Cedar Rapids, IA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 73 days.

(21) Appl. No.: 10/126,477

(22) Filed: Apr. 18, 2002

(65) Prior Publication Data

US 2003/0197585 A1 Oct. 23, 2003

(51) Int. Cl.⁷ .............................. H01F 27/02
(52) U.S. Cl. .................. 336/83; 336/170; 336/212; 336/215
(58) Field of Search .................. 336/65, 83, 212, 336/214, 215, 216, 221, 233, 234, 170

(56) References Cited

U.S. PATENT DOCUMENTS 5,126,714 A   6/1992  Johnson ................. 336/83
5,783,984 A   7/1998  Keuneke ................ 336/155
5,784,266 A   7/1998  Chen ..................... 363/16
6,348,848 B1 * 2/2002  Herbert .................. 336/178

FOREIGN PATENT DOCUMENTS

JP     3-215911    * 9/1991
JP     2000-68132  * 3/2000

* cited by examiner

Primary Examiner—Tuyen T. Nguyen
(74) Attorney, Agent, or Firm—Koppel, Jacobs, Patrick & Heybl (57) ABSTRACT

There is disclosed a core structure with a very low profile, high power density and lower losses. Higher core surface area and improved core utilization in terms of flux density are other desirable feature in the disclosed design. The disclosed design also allowed for a larger core area where the DC fluxes are added, thereby reducing the air-gap requirements in the cores derived from low saturation density materials such as ferrites. The cellular nature of the design can also be effectively employed in vertically packaged power converters and modules.

19 Claims, 7 Drawing Sheets

CORE STRUCTURE

GOVERNMENT INTERESTS

The United States Government has rights in this invention pursuant to Contract No. 48803-8101 (RC) and 44104-8901 (Govt.) between the United States Department of Defense, Office of Naval Research and Rockwell Scientific Co.

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to core structures.

2. Description of Related Art

Power converters are key components in many military and commercial systems and they often govern size and performance. Power density, efficiency and reliability are key characteristics used to evaluate the characteristics of power converters. Transformers and inductors used within these power converters may be large and bulky and often limit their efficiency, power density and reliability.

The magnetic theory controlling the operation of inductors and transformers is well known. The general concepts for combining magnetic functions of inductors and transformers on a single magnetic core structure are also well known. Integrated transformer/inductor devices typically take advantage of a transformer's magnetizing inductance to combine the function of a transformer and the function of an inductor connected in parallel with the transformer's secondary winding on a single core structure.

One type of well-known core is the E-core. An E-core has a cross-section that looks like the capital letter "E." An E-core is typically disposed on its side, with the long part of the E at the bottom, forming a base. E-cores are commonly used in current doubler circuits. To obtain current of different levels, a number of E-cores may be used in a circuit.

E-cores typically have one of two configurations—the EI-core or the EE-core. In the EI-core, a flat plate, the "I," is disposed on top of the basic E-core. In the EE-core, two Es are put together, with the legs of the Es facing each other. The EI-core, the EE-core and other cores incorporating the E core structure are referred to generically as E-cores.

E-cores are typically used for transformers and inductors, and a single E-core may be adapted for use as both a transformer and an inductor. In one typical design, both of the outer legs have a primary and a secondary winding. Current to the windings is typically switched so that only one outer leg at any given time is acting as a transformer. The device is said to have one or two switching periods during which the inductors charge, and a freewheeling period during which the inductors discharge. In devices having two switching phases, the circuitry provides for one outer leg to act as an inductor while the other outer leg is acting as a transformer. Because of their dual but time-separated nature, the outer legs are said to have a transformer phase and an inductor phase. E-cores can be isolated (without transformers) or non-isolated (with transformers). E-cores may also be used only as transformers.

When an outer leg of an E-core is acting as an inductor, magnetic flux is stored in the core. Magnetic flux flows through the outer leg which is acting as an inductor, through the top, the base, and through the center leg of the E. To provide increased energy storage, there is typically an air gap between the center leg and the top. Because of the air gap, the center leg is therefore typically shorter than the outer legs. Inductance in an E-core is primarily determined by the area of the center leg. To obtain higher inductance, the area of the center leg is increased.

One limitation on the area of the center leg is fringing flux. Like bright light from one room leaking under a door into a dark second room, flux from the air gap can spill onto the outer legs. Fringing flux causes current losses in the transformer of the other outer leg. One way to accommodate fringing flux is to place the windings on the outer legs a safe distance from the air gap. To do this, the outer legs may be far from the center leg, or the outer legs may be longer so that the windings may be positioned closer to the base and far enough from the air gap. These two solutions result in either a wider E-core or a taller E-core, both of which can be burdens on mechanical designs. Another way to reduce fringing is to increase the area of the air gap. Fringing varies inversely with the area of the air gap.

Another problem with most E-cores arises from their inefficiency. In general, the energy losses come in the form of heat. This generated heat can become a significant problem, requiring cooling through fans, air flow and other means. The additional power and cooling needs create additional burdens on electronic and mechanical designs.

DESCRIPTION OF THE DRAWINGS

The present invention will be described by way of exemplary embodiments, but not limitations, illustrated in the accompanying drawings in which like references denote similar elements.

DETAILED DESCRIPTION OF THE INVENTION

Throughout this description, the embodiments and examples shown should be considered as exemplars, rather than limitations on the apparatus and methods of the present invention.

A core in accordance with the invention is useful in power modules and power converters. These power modules and power converters are well suited for low voltage, high current DC-DC converter applications. A core in accordance with the invention may have ultra-low profile magnetics, resulting in better utilization, higher inductance, improved efficiency and lower temperature. In typical E-cores, increased compactness results in decreased efficiency. In contrast, in a core of the invention, increased compactness may result in increased efficiency. Improved efficiency is an unexpected benefit of the invention.

Principals of the invention are described below with respect to a half-bridge current doubler rectifier application. The invention is, however, applicable to a wide variety of DC-DC converter topologies and control algorithms. The core of the invention may also be useful in other types of power converters and modules, such as AC-AC and AC-DC. The cellular structure also enables the use of interleaving with multi-phase DC-DC converters to further reduce the current and voltage ripple and higher integration levels for multiple output DC-DC converters with integrated magnetics.

Figure 1:
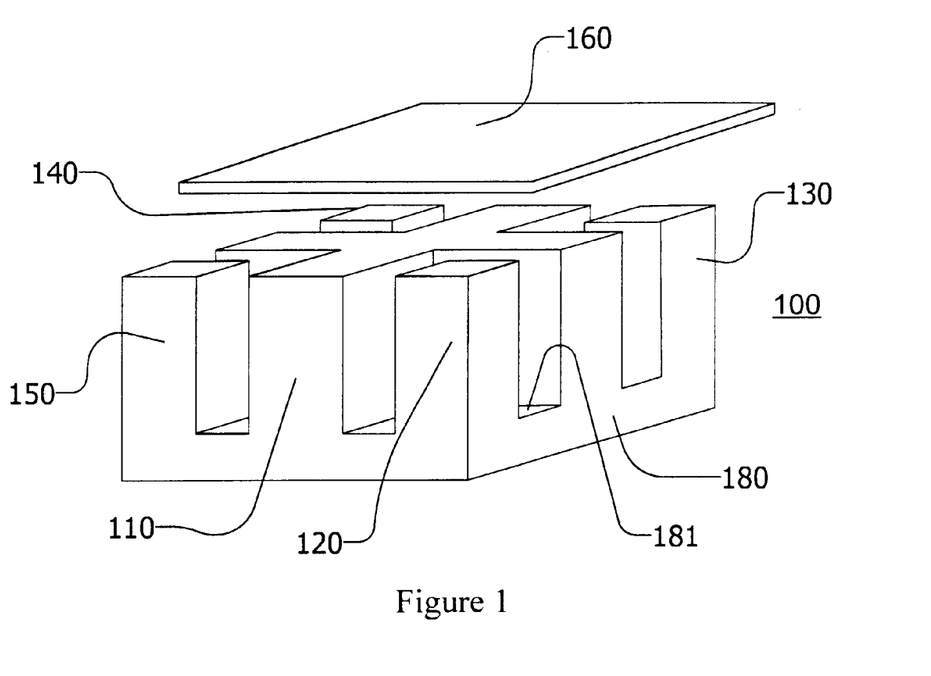
FIG. 1 is an exploded side elevated view of a core having a rectangular design in accordance with the invention.
Figure 2:
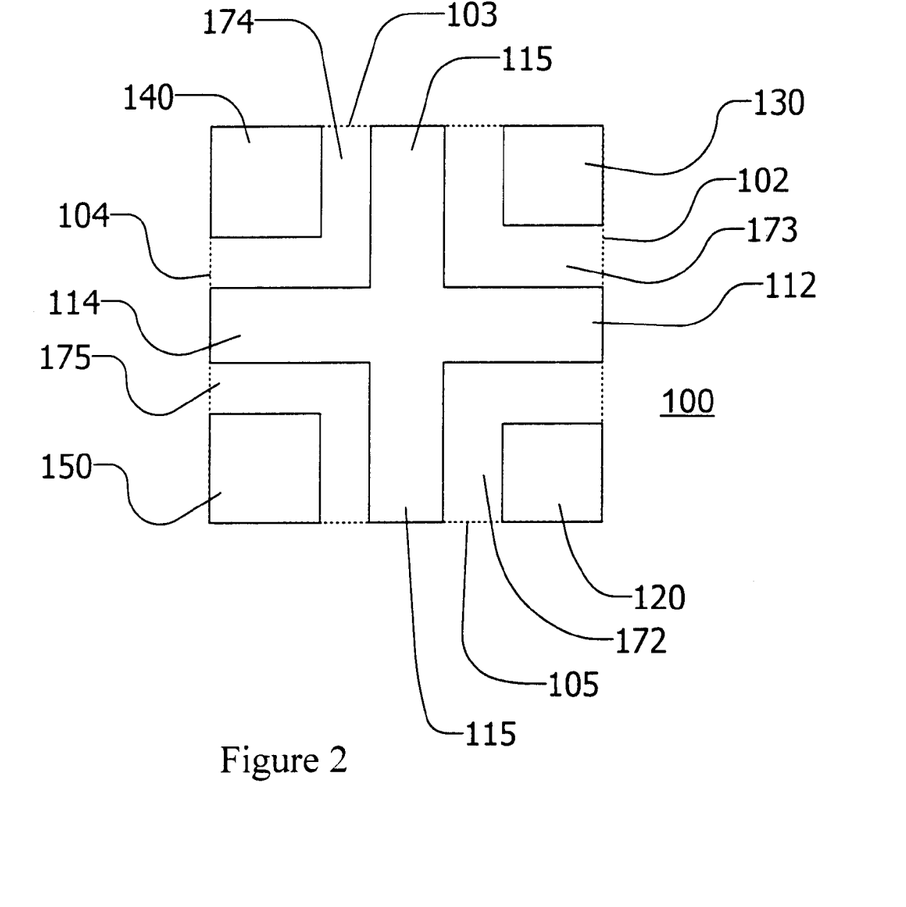
FIG. 2 is a top view of the core of FIG. 1.

Referring now to FIGS. 1 and 2, there are shown two views of a core 100 having a square design in accordance with the invention. The core 100 comprises a base 180, a center portion 110, plural posts 120, 130, 140, 150 and a top 160. The base 180, the posts 120, 130, 140, 150 and the center portion 110 may be produced as an integrated unit. Alternatively, some or all of these parts 100, 110, 120, 130, 140, 150 may be produced separately and joined. The core 100 may be formed of a single material. Alternatively, the materials of the separate components may be different and varied. The materials may be magnetic, such as ferrite, 3F3, powdered iron, nickel-iron alloys, or non-magnetic, or composite.

Whereas the base of a typical E-core has a linear shape, the base 180 of core 100 has a square shape, with the four posts 120, 130, 140, 150 disposed at the four corners of the square. The posts 120, 130, 140, 150 are disposed on a top region 181 of the base 180. Post 120 is disposed at the intersection of outer edges 102 and 105. Post 130 is disposed at the intersection of outer edges 102 and 103. Post 140 is disposed at the intersection of outer edges 103 and 104. Post 150 is disposed at the intersection of outer edges 104 and 105. The base 180 is planar and the top region 181 is flat where exposed, though these configurations are not required.

The center portion 110 is also disposed on the top region 181 of the base 180. The center portion 110 includes legs 112, 113, 114, 115 which are between the posts 120, 130, 140, 150. Leg 112 is disposed between posts 120 and 130. Leg 113 is disposed between posts 130 and 140. Leg 114 is disposed between posts 140 and 150. Leg 115 is disposed between posts 150 and 120. The legs 112, 113, 114, 115 provide separation between the posts 120, 130, 140, 150. In the square-shaped core 100 of FIGS. 1 and 2, the center portion 110 has a plus shape.

The legs 112, 113, 114, 115 and the posts 120, 130, 140, 150 also define respective windows. There is a window 172 between post 120 and center legs 112, 115. There is a window 173 between post 130 and center legs 112, 113. There is a window 174 between post 140 and center legs 113, 114. There is a window 175 between post 150 and center legs 114, 115.

The top 160 of core 100 comprises a flat plate, similar to the top plate of an EI-core. However, a top in accordance with the invention need not be flat or plate-like, may be similar to that of an EE-core, and its shape may be adapted for the desired characteristics of the core.

Figure 3:
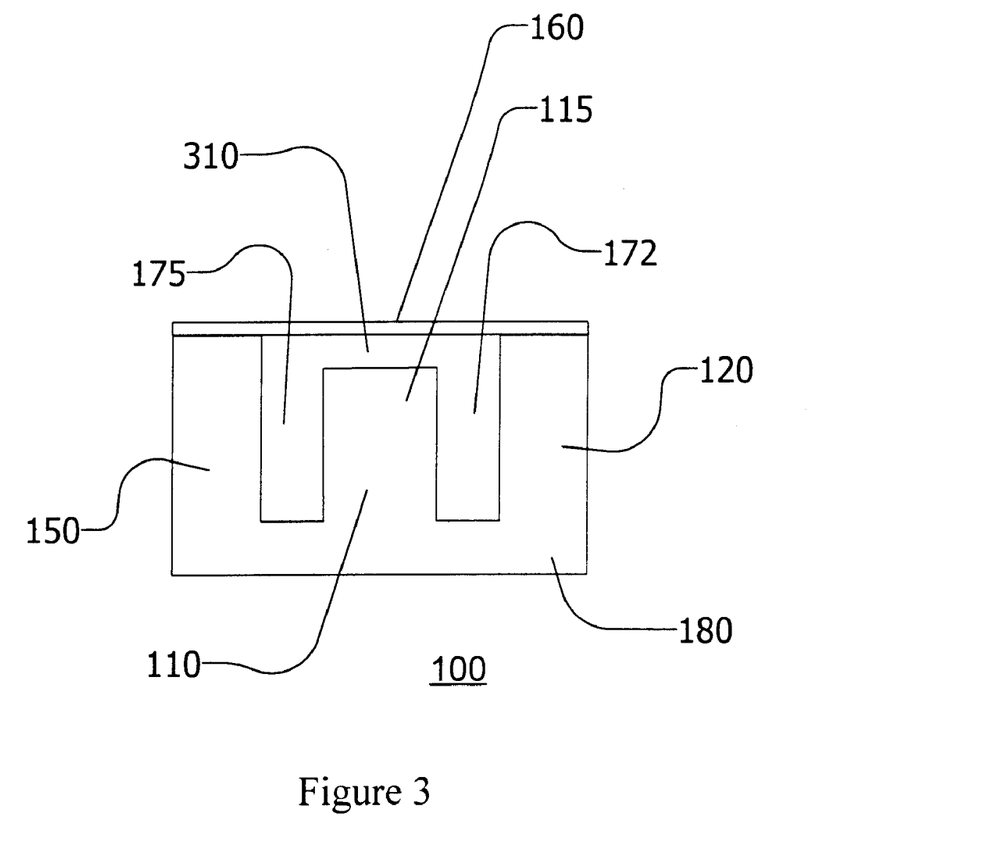
FIG. 3 is a side view of the core of FIG. 1.

Referring now to FIG. 3, there is shown a side view of the core 100. In this view, the core 100 looks like a typical E-core. In this view, an air gap 310 is apparent. The air gap 310 is defined by the top 160 and the center portion 110. The height of leg 115 is exaggerated in this view to make the air gap 310 larger and therefore more apparent. The air gap 310 extends the entire space between the center portion 110 and the top 160—above all of the legs 112, 113, 114, 115.

The view of FIG. 3 demonstrates the cellular nature of a core of the present invention. As used herein, a "cell" comprises two posts, the base and the center portion. Although two posts in part define a cell, windings on these posts and their electrical connections provide further definition of a cell. The number of primary and secondary windings on a given post is selected based in part upon the number of cells which are desired to share the post.

The core 100 may be used in a four cell structure. The combination of the two posts 120, 150 with the center portion 110 and the base 180 may be used in one cell of the core 100. The view taken from any of the four sides 102, 103, 104, 105 of the core 100 has the same appearance. Thus, the four cells of core 100 may be comprised of the center portion 110, the base 180 and any two adjacent posts: post 120+post 150, post 120+post 130, post 130+post 140, or post 140+post 150. Whether such a combination is a cell, however, depends on the windings on each post.

One of the benefits of the core of the present invention is the presence of a shorter air gap than would be found in a comparable typical E-core or collection of E-cores. Whereas a typical E-core has a center leg between the two outer legs, the core of the invention has a center portion which may be considerably larger in comparison. The larger center portion may result in a shorter air gap. The shorter air gap has reduced fringing flux, meaning that the core may be more compact. In use, a power converter or power module of the invention should be considerably more efficient than a collection of E-cores providing comparable outputs. Thus, power consumption is reduced, heat losses are reduced, cooling requirements are reduced, and overall size requirements are reduced.

Figure 4A:
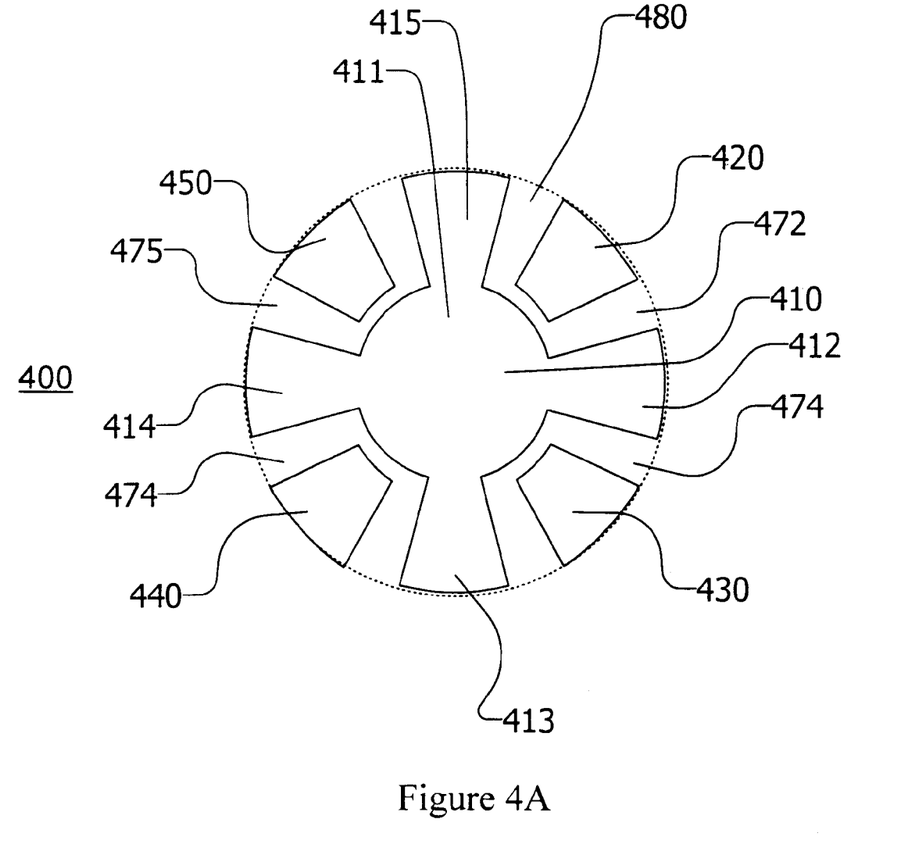
FIG. 4A is a top view of a core having a radial design in accordance with the invention.

Referring now to FIG. 4A, there is shown a top view of a core 400 having a radial design in accordance with the invention. The radial core 400 is similar to the rectangular core 100 of FIG. 1. The core 400 includes a base 480, center portion 410, posts 420, 430, 440, 450 and windows 472, 473, 474, 475. The base 480 is round and the posts 420, 430, 440, 450 are disposed on its perimeter. The center portion 410 has a round central portion 411 Legs 412, 413, 414, 415 radiate from the central portion 411.

Figure 4B:
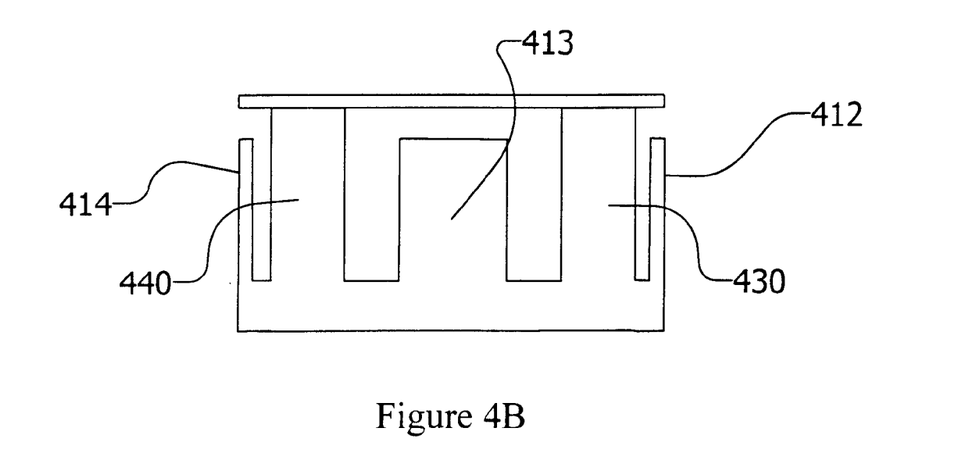
FIG. 4B is a side view of the core of FIG. 4A.

The core 400 has a cellular structure. Referring now to FIG. 4B, there is shown a side view of the core 400. From the side, the core 400 has substantially the same appearance as the rectangular core 100 shown in FIG. 3. In FIG. 4B, the visible cell comprises posts 430, 440, the center portion 410 and the base 480. The core 400 has three more cells, also comprised of the center portion 410, the base 480, and: post 420+post 430, post 440+post 450, and post 420+post 450.

The desired transformer and inductor behavior, as well as cost and mechanical constraints, determine dimensions of the core, posts, legs, windows and air gap. Although the cores 100, 400 are symmetric, a core of the invention may be asymmetric. There may be variations amongst the posts, legs, windows and air gap in their sizes, shapes and placement on the base. The solid geometries of the posts, legs, center portion and base may also be varied. The number of windings on each post may be varied.

Although some center portion must be included in a core, the legs may be omitted. The legs improve performance of the power conducting device by giving a shorter or more direct path to the center area. The legs also contribute to the larger area of the center portion and the larger area of the air gap.

Because of the large center portion of a core of the invention, very high inductance can be obtained from a smaller device. The size and shape of the center portion may be determined from the maximum flux density of the material and the total load current. How far the legs extend to, along side and past the posts may be determined from many factors, including performance, cost, and ease of manufacturing.

Figure 5A:
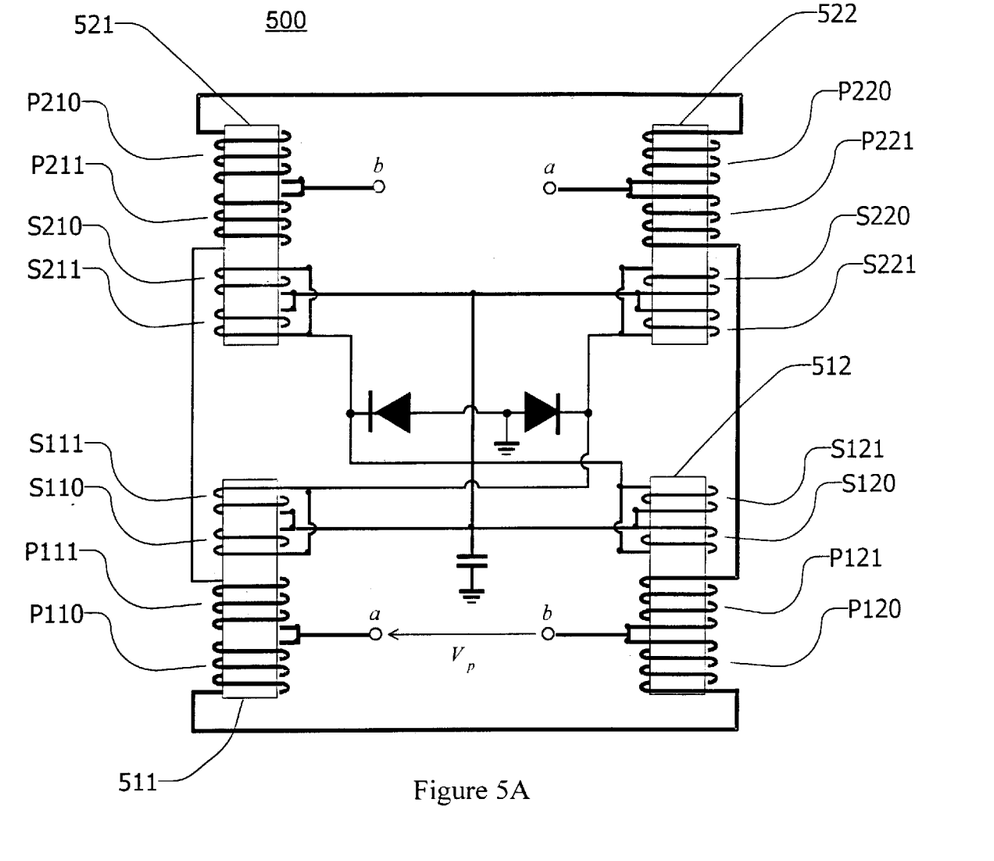
FIG. 5A is a diagram showing a winding arrangement and some electrical components for a power converting apparatus in accordance with the invention.

FIG. 5A is a diagram showing a winding arrangement, wiring and some components for a four cell power converting apparatus 500 in accordance with the invention. A center portion is not shown in FIG. 5. The winding arrangement of FIG. 5A is compatible with both the rectangular core 100 of FIG. 1 and the radial core 400 of FIG. 4. The power converting apparatus 500 includes posts 511, 512, 521, 522. The posts 511, 512, 521, 522 have respective primary windings P110, P111, P120, P121, P210, P211, P220, P221 and secondary windings S110, S111, S120, S121, S210, S211, S220, S221. The windings may be, for example, copper, aluminum, gold or silver wire, or formed from alloys, ceramics or other electrically conductive materials. In most embodiments, the winding directions will be chosen so that the magnetic fluxes generated in the posts are additive in the center portion. However, it may also be desirable to have one or more posts generate subtractive flux.

In the four cell core 500 of FIG. 5, the posts 511, 512, 521, 522 each have two primary windings and two secondary windings. For example, a cell comprising posts 511 and 512 includes primary windings P110 and P120. The other cells include, respectively, posts 521, 522 and windings P210, P220, posts 511, 521 and windings P111, P211, and posts 512, 522 and windings P121, P221. When the primary voltage is of a given polarity, the secondary windings on diagonally opposite posts (e.g., 511 and 522, and 521 and 512) share the load current. The energy due to the primary current in the posts in their inductor phase is stored in the air gap of the center portion. Thus, the load current is divided into four parallel paths when the power is transferred across the transformer core and into eight parallel paths during the freewheeling period.

Figure 5B:
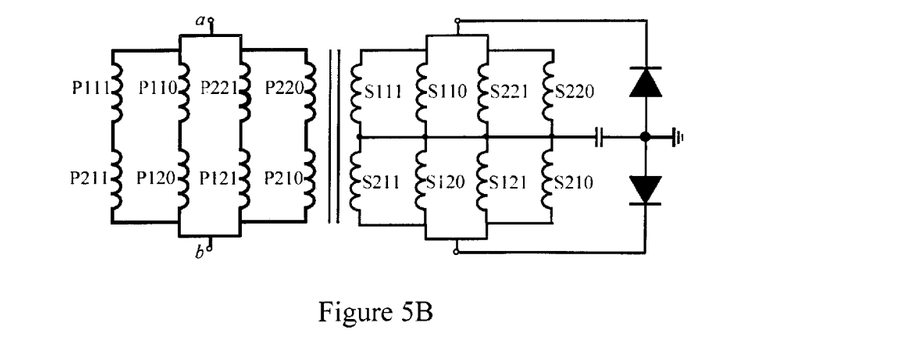
FIG. 5B is a circuit diagram corresponding to FIG. 5A.

Referring now to FIG. 5B, there is shown a circuit diagram corresponding to the diagram of FIG. 5A. A typical E-core is used in a current doubler circuit. The circuit of FIG. 5B is a current quadruplet.

Figure 6:
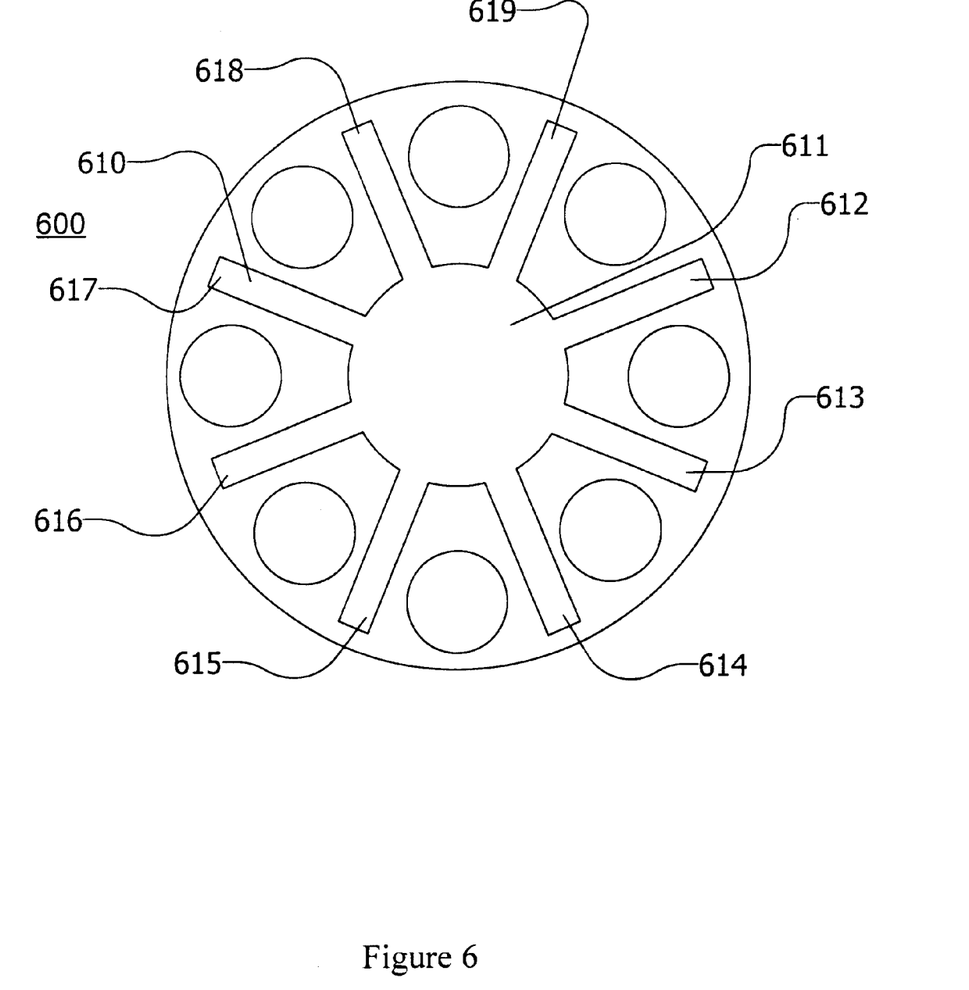
FIG. 6 is a top view of a core having a radial design in accordance with the invention.

FIG. 6 shows a diagram of another core 600 having a radial design. Center portion 610 has a round center 611 and radial legs 612, 613, 614, 615, 616, 617, 618, 619. The eight cell structure of core 600 may be derived from the four cell structure of FIG. 3 by adding additional sectors (posts, legs and windows). Like the radial four cell structure, the radial eight cell structure has two primary windings and two secondary windings on each post.

Figure 7:
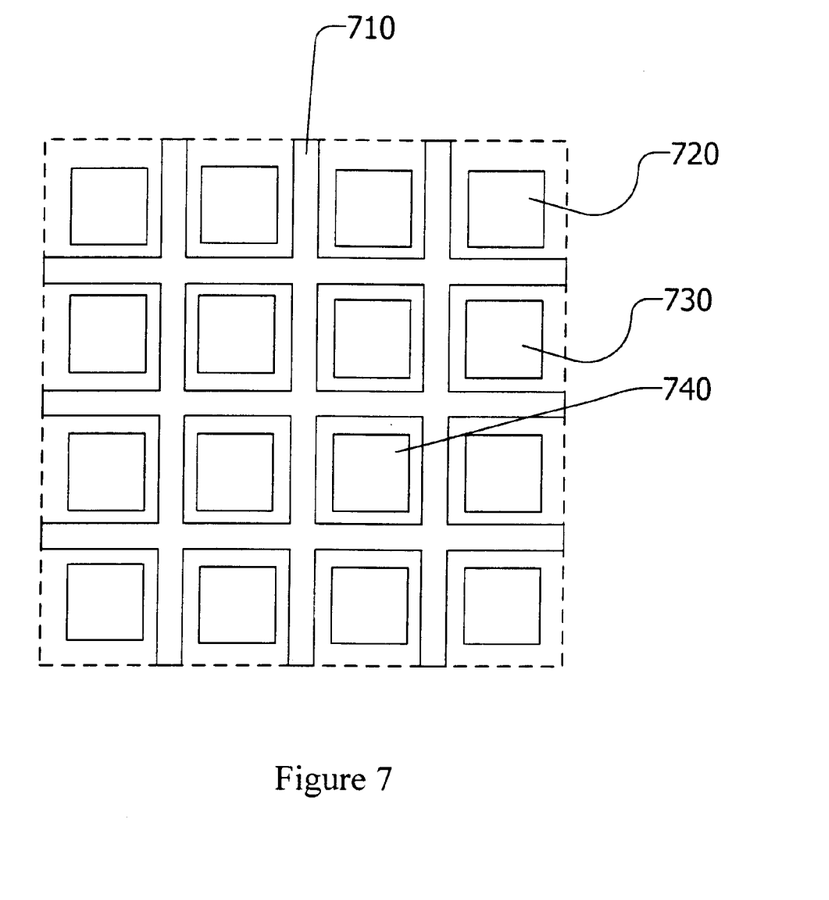
FIG. 7 is a top view of a core having a rectangular design in accordance with the invention.

FIG. 7 shows a diagram of a core 700 having a rectangular design in accordance with the invention. In FIG. 7, the center portion 710 has a grid shape, which can be considered an extension of the plus-shaped center portion 110 of the core 100 of FIGS. 1 and 2. The structure of core 700 may be derived by replicating the core of FIG. 2 three times. The number of primaries and secondaries on the posts determine the number of cells. If each post of core 700 is wound with two primaries and two secondaries, a sixteen cell structure results. But if each post of core 700 is wound with four primaries and four secondaries, then posts 720 on the corners will still share with two neighbors, but posts 730 on the edges will share with three neighbors and posts 740 on the interior will share with four neighbors—resulting in a 24 cell structure.

The core may have other shapes besides square and circle. The desired number of cells may be used to determine the shape. The shape may be rectangular, hexagonal, trapezoidal, oval, T-shaped, L-shaped and other regular and irregular shapes.

A core in accordance with the invention may be viewed as a combination of typical E-cores. In this way, the E-core may be considered an elementary cell, and a core of the invention may be derived by integrating multiple such cells with a shared center portion. By replicating elementary cells, one can develop higher current modules without compromising performance and power density.

As can be seen, this cellular structure enables the development of novel interleaving schemes to reduce switching ripple in inductor current and output voltage. It also facilitates higher integration for multiple output, power supplies with integrated magnetics. The invention is applicable to both symmetrical and asymmetrical control schemes.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A core comprising:

a base having an outer edge and a top region, a first post disposed on the top region of the base at the outer edge, a second post disposed on the top region of the base at the outer edge, a third post disposed on the top region of the base at the outer edge, a fourth post disposed on the top region of the base at the outer edge, a shared common center portion disposed on the base, a top disposed on the posts and opposite the base, wherein the first post and the center portion are separated on the base to thereby define a first window, the second post and the center portion are separated on the base to thereby define a second window, the third post and the center portion are separated on the base to thereby define a third window, the fourth post and the center portion are separated on the base to thereby define a fourth window, and the top and center portion are spaced apart to thereby define an air gap, eight primary windings and eight secondary windings in an arrangement on the core, the arrangement defining four cells each comprising two primary windings and two secondary windings, and a control circuit having an output connected to the primary windings, the control circuit having at least two phases, said phases being power transfer phases, in which current runs from the output in a first direction during a first power transfer phase and in the opposite direction during a second power transfer phase, two of the cells being powered by the control circuit during the first power transfer phase and the other two cells being powered by the control circuit during the second power transfer phase, said arrangement forming a power converter suitable for providing a load current to a load.

2. The core of claim 1, wherein the first post, the second post, the third post, the fourth post are disposed on the base in a rectangular matrix.

3. The core of claim 2, wherein the rectangular matrix is square.

4. The core of claim 1, wherein the base has a square shape and the posts are each disposed at a different corner of the square shape.

5. The core of claim 4, wherein the center portion has plural legs in a plus shape.

6. The core of claim 1, wherein the posts are disposed on the base in a symmetrical pattern.

7. The core of claim 1, wherein the windings have respective directions, and the directions provide for additive flux in the center portion when the windings are energized as inductors.

8. The core of claim 1, wherein the base, the posts and the center portion are an integrated unit.

9. The core of claim 1, wherein the base, the posts and the center portion are formed of a single material.

10. The core of claim 1, wherein the posts have a common height measured from the base, and the center portion has a height which is less than the common height of the posts.

11. The core of claim 1, wherein the posts have a common shape.

12. The core of claim 1, wherein the posts have a rectangular shape.

13. The core of claim 1, wherein each of said first, second, third and fourth posts has two of said primary windings and two of said secondary windings.

14. The core of claim 13, wherein the directions of said windings are arranged such that magnetic fluxes generated in said posts are additive in said common center portion.

15. The core of claim 13, wherein said control circuit is further arranged to have a freewheeling phase during which the currents in all of said primary windings are zero and the currents in the secondary windings of all four cells deliver said load current.

16. The core of claim 13, wherein said control circuit energizes said windings such that said power converter is a current doubler rectifier (CDR).

17. The core of claim 16, wherein said control circuit is further arranged to have a freewheeling phase during which the currents in all of said primary windings are zero and the currents in the secondary windings of all four cells deliver said load current.

18. The core of claim 17, wherein the control circuit energizes said windings such that said CDR has said first and second power transfer phases and a freewheeling phase, the load current provided by said CDR divided into four parallel paths during said power transfer phases when power is transferred across said core from said primary windings to said secondary windings, and into eight parallel paths during said freewheeling phase.

19. A current doubler rectifier (CDR), comprising:

a core structure, comprising:
  a base having an outer edge and a top region,
  a first post disposed on the top region of the base at the outer edge,
  a second post disposed on the top region of the base at the outer edge,
  a third post disposed on the top region of the base at the outer edge,
  a fourth post disposed on the top region of the base at the outer edge,
  a shared common center portion disposed on the base,
  a top disposed on the posts and opposite the base,
  wherein the first post and the center portion are separated on the base to thereby define a first window, the second post and the center portion are separated on the base to thereby define a second window, the third post and the center portion are separated on the base to thereby define a third window, the fourth post and the center portion are separated on the base to thereby define a fourth window, and the top and center portion are spaced apart to thereby define an air gap, eight primary windings and eight secondary windings in an arrangement on the core, wherein each of said first, second, third and fourth posts has two of said primary windings and two of said secondary windings, the arrangement defining four cells each comprising two primary windings and two secondary windings, and a control circuit having an output connected to the primary windings, the control circuit having first and second power transfer phases and a freewheeling phase, in which current runs from the output in a first direction during said first power transfer phase and in the opposite direction during said second power transfer phase and the currents in all of said primary windings are zero during said freewheeling phase, two of the cells being powered by the control circuit during the first power transfer phase and the other two cells being powered by the control circuit during the second power transfer phase, said arrangement forming a CDR suitable for providing a load current to a load such that the load current provided by said CDR is divided into four parallel paths during said power transfer phases when power is transferred across said core from said primary to said secondary windings, and into eight parallel paths during said freewheeling phase when the currents in the secondary windings of all four cells deliver said load current.

* * * * *